(No Model.) 2 Sheets—Sheet 2.
H. R. COLLINS.
VEHICLE WHEEL.
No. 594,603. Patented Nov. 30, 1897.
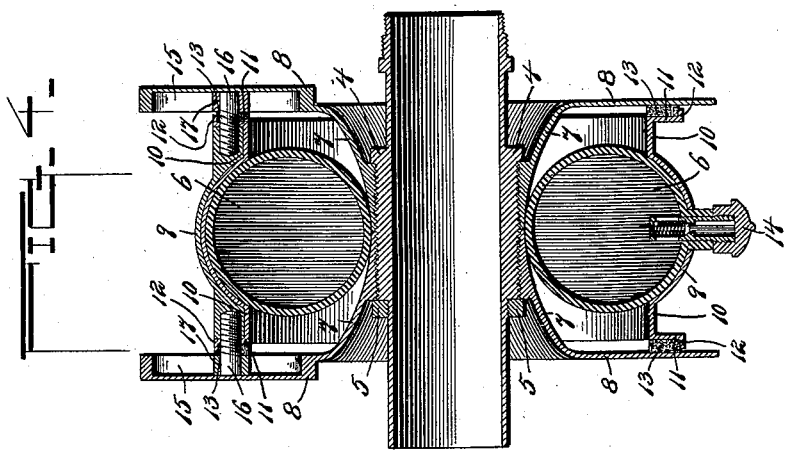
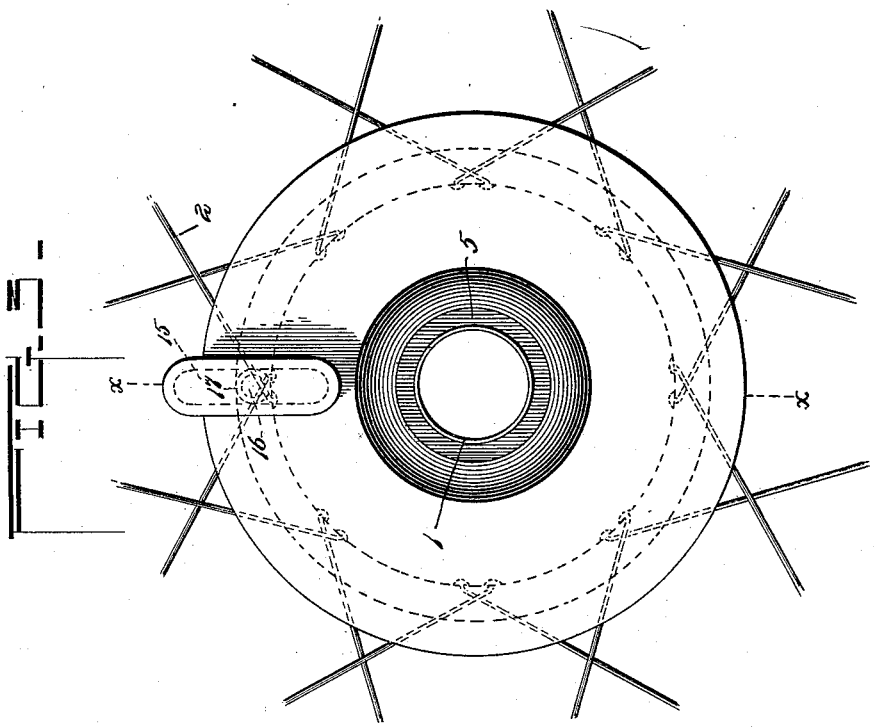
Witnesses
Milton O'Connell
V. B. Hillyard.
Inventor
Harry R. Collins,
By his Attorneys,
C. A. Snow & Co.

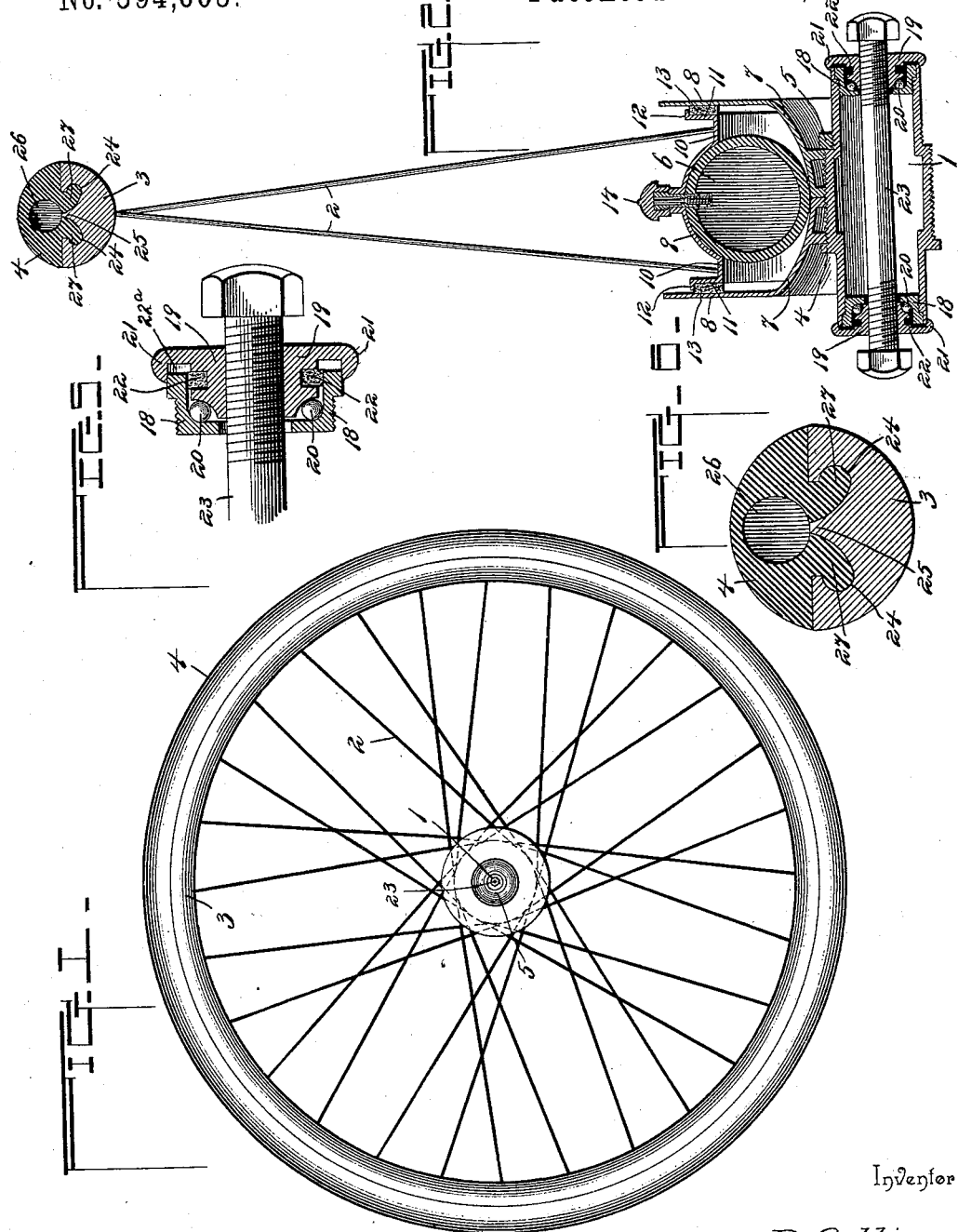

UNITED STATES PATENT OFFICE.

HARRY R. COLLINS, OF SOUTH BETHLEHEM, PENNSYLVANIA.

VEHICLE-WHEEL.

SPECIFICATION forming part of Letters Patent No. 594,603, dated November 30, 1897.

Application filed March 31, 1897. Serial No. 630,164. (No model.)

*To all whom it may concern:*

Be it known that I, HARRY R. COLLINS, a citizen of the United States, residing at South Bethlehem, in the county of Northampton and State of Pennsylvania, have invented a new and useful Vehicle-Wheel, of which the following is a specification.

By this invention all the advantages derived from the use of pneumatic tires are embodied in the construction of vehicle-wheels without introducing the objectionable features tending to detract from the efficiency and durability of this class of tires. The pneumatic cushion, instead of being located at the rim or tread-surface of the wheel, is arranged at the hub, where it is not liable to puncture or subject to wear by traction.

One of the principal objects of the present invention is to improve that class of vehicle-wheels having a pneumatic cushion at their hub, and to provide for the spread of the cushion or tube in substantially the same manner as effected by a pneumatic tire at the point of contact with the road or supporting-surface, thereby securing easy and comfortable riding and obviating all jar which would otherwise be transmitted to the rider when journeying over a rough road or passing over obstructions.

A further purpose of the improvement is to exclude dust, wet, and foreign matter from the annular chamber or space in which is located the pneumatic cushion or tube, and also to provide an improved ball-bearing with cooperating ball-race or cup and cone, between the bearing-surfaces of which the balls are confined, together with means for excluding dust and dirt from the ball-race without compressing the washer or packing by which the dust and dirt are excluded when the parts are adjusted or secured together more or less tightly in use.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a vehicle-wheel of the improved construction. Fig. 2 is a transverse section of a portion thereof. Fig. 3 is a side elevation of the hub portion of a drive-wheel. Fig. 4 is a section on the line X X of Fig. 3. Fig. 5 is a detail section of the dust-proof bearing. Fig. 6 is a detail section of the cushion-tire and rim.

Corresponding and like parts are referred to in the following description and indicated in the several views of the accompanying drawings by the same reference-characters.

In general appearance the vehicle-wheel is of ordinary construction of the type having a pneumatic hub, and comprises a hub 1, spokes 2, rim 3, and tire 4. The hub 1 has its middle portion threaded externally and provided with a shoulder 4 at one end of the threaded portion and a removable collar 5 at the opposite end, said collar having a screw-thread connection with the hub, the threads of which run in an opposite direction to the threads of the intermediate portion, whereby the saddle applied to the threaded portion of the hub is securely held in place.

In order to admit of the pneumatic tube or cushion 6 being placed in position, the saddle is constructed of similar and complementary parts which are separable on a line corresponding with the center of the wheel, and these parts are threaded and mounted upon the threaded portion of the hub. The saddle forming a seat for the annular pneumatic cushion or tube 6 is formed of rings 7, which flare outwardly and terminate in annular flanges 8, extending parallel, the flaring portions of the rings unitedly forming a seat of greater curvature than the pneumatic tube or cushion 6, whereby the inner portion of the said cushion or tube can flatten in a manner similar to the spread of a pneumatic tire at the point sustaining the load, so that greater ease and comfort are afforded the rider.

The spoke-ring 9 conforms snugly to the outer portion of the pneumatic tube or cushion 6, and has horizontal end extensions 10 and outwardly-extending flanges 11 and terminal horizontal flanges 12, the latter retaining in place rings 13 of fibrous material, whereby a dust-proof joint is had between the spoke-ring and the parallel flanges 8 of the saddle. The valve 14, by means of which the pneumatic cushion or tube 6 is inflated, extends through the spoke-ring, and a pump or inflating device of ordinary construction is adapted to be fitted thereto in the usual way for inflating the part 6 when required.

The foregoing construction applies to vehicle-wheels generally, but when it is required to apply power to the wheel for propelling the machine or vehicle it is highly important that a positive locking means be interposed between the hub portion and the body of the wheel, said connection being of such character as to admit of the radial movements of the hub with reference to the body of the wheel, so as to compensate for jar and vibration.

As shown, the parallel flanges 8 of the saddle are thickened at points alining transversely and are formed with radial grooves or slots 15, and the spoke-ring has corresponding enlargements, in which are fitted pins 16, the latter entering and operating in the guideways 15, whereby the spoke-ring and saddle are caused to rotate together. To reduce the friction between the pins 16 and the guideways 15 to the smallest degree possible, sleeves or antifriction-bearings 17 are mounted upon the outer ends of the pins and are located in the guideways. By reason of the firm connection of the saddle with the hub and the rigid connection of the spokes with the ring 9 and the sliding and positive connection between the saddle and spoke-ring the component parts of the wheel are caused to rotate together, while at the same time they can move independently radially to permit of the pneumatic tube taking up jar and jolt. Moreover, by the single pivotal connection thus formed between the saddle and spoke-ring a relative rectilinear movement is permitted and also a swinging or oscillatory movement of the spoke-ring about said pivot as a center, thus permitting the compression of the cushion at any point along its circumference. In some cases the projections or studs for engaging the radial grooves or slots in the side plates or flanges of the saddle may be formed on or carried by the saddle instead of the spoke-ring, in which case the radial grooves or slots may be formed in plates or flanges carried by the spoke-ring, this being an obvious transposition of parts and the equivalent of the construction shown.

The dust-proof bearing at the ends of the hub consists of a cup or ball-race 18, a cone 19 entering the cup, and balls 20 between the cup and cone. The cone has an outer flange 21 at its outer end, which is, as at 22$^a$, on its inner side to receive the outer end of the cup, and has an annular groove 22 at the base of the flange 21 at right angles to the axis of the cone to receive a felt washer, which precludes the entrance of dust or other foreign substance into the ball-race. The cup is secured to the hub by a screw-thread connection, and the cone has a like connection with the axle 23, thereby admitting of access to the bearing by removing the cone without disturbing the cup. With this arrangement of the washer in the cone it will be seen that no matter how tightly or how far the cone is moved into the ball-race there will be no compression of the washer, but, on the other hand, it will always bear against the ball-race or projecting portion thereof entering the groove of the cone and overlying the packing-ring, thus effectually preventing any dust or dirt from entering the ball-race.

The rim 3 has annular grooves 24 in its outer side, said grooves flaring outwardly at their inner ends and being separated by an intermediate V-rib 25. The cushion-tire 4 has a bore or opening 26 and interlocking ribs 27 at its inner side, said ribs flaring outwardly and adapted to be forced into the grooves 24 of the rim 3 and interlock therewith. The V-rib 25 coming between the ribs 27 forces the latter outward and holds them in the grooves 24, whereby a firm connection is had between the tire and rim. This construction of the outer tire or rim forms the subject-matter of another application filed by me on June 23, 1897, Serial No. 641,955.

Having thus described the invention, what is claimed as new is—

1. In a vehicle-wheel, the combination with a hub exteriorly screw-threaded at its middle portion with a shoulder or collar at one terminus of the screw-thread, a saddle provided with an interior screw-thread engaging the screw-threaded part of the hub and abutting against the said shoulder, a removable interiorly-screw-threaded collar screwing on the hub and against the saddle for locking it on the hub, a pneumatic tube on said saddle, and a spoke-ring inclosing said tube, substantially as described.

2. In a vehicle-wheel the combination with a hub exteriorly screw-threaded at its middle portion with a shoulder or collar at one terminus of the screw-thread, a saddle formed of a pair of similar parts each provided with an interior screw-thread engaging the screw-threaded part of the hub and one abutting against the collar and the other against its mate, a removable interiorly-screw-threaded collar screwing on the hub and against the saddle for locking the latter on the hub, a pneumatic tube on said saddle, and a spoke-ring inclosing said tube, substantially as described.

3. In a vehicle-wheel, the combination of a hub, an annular saddle mounted fixedly thereon and having parallel sides or flanges, a pneumatic tube seating around said saddle between its sides, a spoke-ring embracing said tube on its outer side and having flanges extending outwardly parallel with the sides of the saddle, and terminal flanges on said outwardly-extending flanges, and ring-washers interposed between the said outwardly-extending flanges of the spoke-ring and the saddle sides and confined by the terminal flanges, said ring-washers constituting closures for the pneumatic-tube-containing chamber, while permitting radial movement of the saddle and spoke-ring, substantially as described.

4. In a ball-bearing, the combination of a cone having a projecting flange with a groove in one side thereof and a second groove in the inner side of the first groove at right angles to the axis of the cone, and a washer or packing-ring in the latter groove; with a ball-race having a projecting portion adapted to enter the first groove of the cone and overlie the packing in the second groove, and balls interposed between the ball-race and cone, for the purpose and substantially as described.

5. In a vehicle-wheel, the combination with a hub, of an annular saddle having a vertically-disposed flange or plate at each side thereof provided with a radial groove or slot in its inner face arranged opposite or in alinement with the corresponding groove in the inner face of the other flange, a pneumatic tube or cushion seated on said saddle, and a spoke-ring movable relatively to said saddle so as to effect the compression of said tube and having a stud or lateral projection at each side thereof engaging one of said radial grooves; whereby a pivotal connection is formed between the saddle and spoke-ring to compel them to rotate together while permitting relative rectilinear movement thereof and a swinging or oscillatory movement of the spoke-ring about said pivot as a center, substantially as described.

In testimony that I claim the foregoing as my own I have hereto affixed my signature in the presence of two witnesses.

HARRY R. COLLINS.

Witnesses:
 CHAS. H. GROMAN,
 H. L. WICKERT.